H. LINDENBERGER.
APPARATUS FOR SMOKING SALMON.
APPLICATION FILED JULY 2, 1908.
961,869.
Patented June 21, 1910.
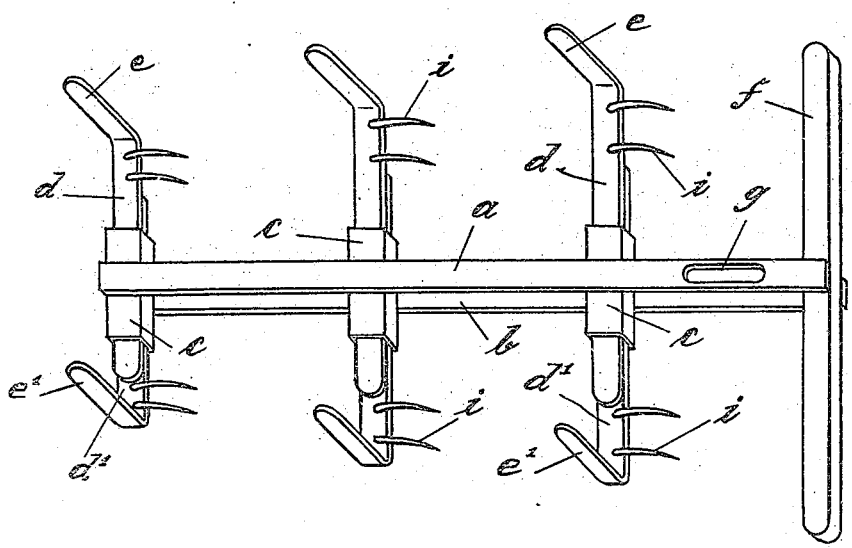
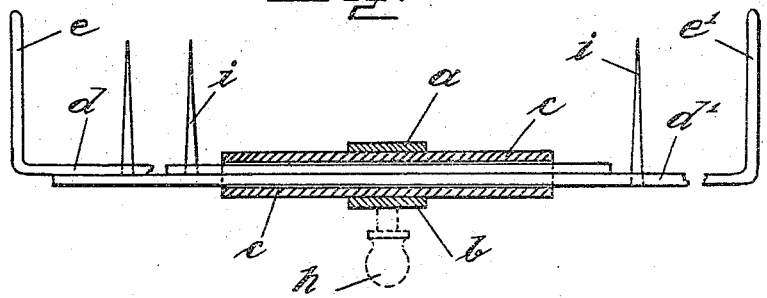
Witnesses:
Inventor:

UNITED STATES PATENT OFFICE.

HERMANN LINDENBERGER, OF BERLIN, GERMANY.

APPARATUS FOR SMOKING SALMON.

961,869.  Specification of Letters Patent.  Patented June 21, 1910.

Application filed July 2, 1908. Serial No. 441,611.

*To all whom it may concern:*

Be it known that I, HERMANN LINDENBERGER, merchant, a subject of the King of Prussia, residing at Berlin, 8 am Königsgraben, Prussia, Germany, have invented certain new and useful Improvements in Apparatus for Smoking Salmon, of which the following is a specification.

My invention relates to an improved apparatus for smoking salmon, and the object of my invention is, to provide an apparatus, the constituent parts of which are so constructed and combined to be readily adjusted with relation to each other. By this means the apparatus is adapted to be employed for smoking fish of varying size, or portions of fish of different length and width.

The mechanical means usually employed for holding the salmon while exposed to smoking consists of an apparatus or a kind of grate to which the fish is hooked or secured, and the bars or rods of said grate, carrying tines for retaining the fish, are rigidly connected to each other, whereby the said tines are unvariable in their position with relation to each other. For this reason it will occur that fish or portions of fish of varying size, in being fastened to the grate, are not properly seized but become torn or chinky, and in consequence, they will be greatly liable to become dry or spoiled, owing to the cracks or fissures in the flesh, through which the atmosphere may enter and work its evil effects.

To adapt the smoking apparatus for varying sizes of salmon or other fish, or portions of fish, I have constructed the grate in a manner to be easily adjusted to accommodate to any size of fish.

The accompanying drawings illustrate an apparatus constructed according to this invention.

Figure 1 is a perspective view of the grate for holding the fish while exposed to smoke, and Fig. 2 is a sectional elevation of part of the grate, showing the mechanical means for adjusting the constituent parts of the grate with relation to each other.

The grate consists of a bar or bars $a$, and another bar or bars $b$, parallel to the bar or bars $a$, the said bar or bars $a$, being placed above the bar or bars $b$, with a suitable distance between them. Between the said bars $a$, and $b$, sleeves $c$, extend across said bars $a$, and $b$, said sleeves being adapted to be shifted toward or from each other and to be secured in any desired position. The said sleeves, preferably, are of rectangular cross-section, and fitting into said sleeves $c$, two bars $d$, and $d^1$, are introduced from opposite sides, one upon the other, said bars being adapted to be shifted in the direction of their length within the common sleeve $c$, thereby approaching the bent, upturned ends $e$, $e^1$, of the two bars $d$, $d^1$, to each other or removing the same from each other. To retain the desired position of the two bars $d$, $d^1$, with relation to each other, a screw or screws, such as indicated by $h$, or any other adjusting means may be employed. To the said bars $d$, and $d^1$, tines $i$, are secured at suitable intervals, and it will be readily seen, that, by adjusting or varying the reciprocal position of the bars $d$, and $d^1$, the set of tines $i$, carried by either of said bars will be equally adjusted with relation to the other set.

It will be readily understood, that, by adjusting the sleeves $c$, toward or from each other, and by adjusting the bars $d$, and $d^1$, with their sets of tines $i$, toward and from each other, the holding tines for seizing and retaining the fish may be so adjusted to secure the fish without stretching or tearing the same, the adjustment being made to accommodate the varying size of the fish.

The two parallel bars $a$, and $b$, are secured to each other at one end by a cross-bar $f$, and a slot $g$, may be provided in one or both of said bars, for suspending the apparatus in the smoke-room.

The bars $a$, and $b$, as well as the sleeves $c$, and cross-bars $d$, $d^1$, may be made of iron or other metal, and in such case the metal may be galvanized or coated with a suitable varnish or paint to prevent oxidation.

The upturned ends $e$, $e^1$, of the cross-bars $d$, $d^1$, serve to engage the fish from opposite sides, when placed upon the bars $d$, $d^1$, the said bars having been properly adjusted according to the size of the fish. By thus holding the fish between the clamping ends $e$, $e^1$, of the bars $d$, $d^1$, it will be prevented from spreading or extending while exposed to the smoke, and it will retain its proper shape, thereby avoiding chinks, cracks and fissures in the flesh, which, afterward, used to cause the spoiling influence of the atmosphere.

I claim as my invention:

Apparatus for smoking salmon, comprising a grate consisting of longitudinal bars, sleeves placed between said bars and extending across the same, bars passing through said sleeves and projecting from either side of the same, tines carried by said bars in the sleeves, means carried by the ends of said cross-bars for holding the fish, and means for adjusting said cross-bars in position, substantially as and for the purpose set forth.

In testimony whereof I have hereunto set my hand in the presence of two witnesses.

HERMANN LINDENBERGER.

Witnesses:
HUGO SCHUBEL,
PAUL KARSTEDT.